(12) United States Patent
Yasaki et al.

(10) Patent No.: US 8,966,489 B2
(45) Date of Patent: Feb. 24, 2015

(54) INFORMATION PROCESSING DEVICE, INFORMATION PROCESSING METHOD, AND COMPUTER PRODUCT

(75) Inventors: Kouichi Yasaki, Kawasaki (JP); Kazuaki Nimura, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1362 days.

(21) Appl. No.: 12/393,601

(22) Filed: Feb. 26, 2009

(65) Prior Publication Data

US 2009/0240924 A1    Sep. 24, 2009

(30) Foreign Application Priority Data

Mar. 24, 2008    (JP) .................................. 2008-076433

(51) Int. Cl.
*G06F 9/455*    (2006.01)
(52) U.S. Cl.
CPC .. *G06F 9/45558* (2013.01); *G06F 2009/45575* (2013.01)
USPC .......................................... 718/102; 718/103
(58) Field of Classification Search
USPC ................................................. 718/102, 103
See application file for complete search history.

(56) References Cited

U.S. PATENT DOCUMENTS

| | | | |
|---|---|---|---|
| 7,167,916 B2 * | 1/2007 | Willen et al. .................. 709/226 |
| 7,191,440 B2 * | 3/2007 | Cota-Robles et al. ............. 718/1 |
| 7,251,815 B2 * | 7/2007 | Donovan et al. ............... 718/105 |
| 7,395,416 B1 * | 7/2008 | Sathaye ......................... 712/218 |
| 7,516,252 B2 * | 4/2009 | Krithivas ......................... 710/37 |
| 7,739,415 B2 * | 6/2010 | Banzhaf et al. ................ 709/250 |
| 8,095,932 B2 * | 1/2012 | Merten et al. .................. 718/104 |
| 2003/0074542 A1 * | 4/2003 | Sasagawa ....................... 712/20 |
| 2006/0053413 A1 * | 3/2006 | Kimura et al. ................ 717/124 |
| 2007/0277179 A1 | 11/2007 | Suzuka |
| 2008/0104602 A1 * | 5/2008 | Takeuchi ....................... 718/103 |
| 2008/0229077 A1 * | 9/2008 | Sathaye ......................... 712/216 |
| 2008/0301673 A1 * | 12/2008 | Kawasaki et al. .................. 718/1 |
| 2009/0049446 A1 * | 2/2009 | Merten et al. .................. 718/103 |
| 2009/0055633 A1 * | 2/2009 | Sathaye ......................... 712/229 |

FOREIGN PATENT DOCUMENTS

| | | |
|---|---|---|
| JP | 2001-142725 | 5/2001 |
| JP | 2002-182560 | 6/2002 |
| JP | 2002366914 A  * | 12/2002 |
| JP | 2005-157786 | 6/2005 |
| JP | 2006-127461 | 5/2006 |

OTHER PUBLICATIONS

Japanese Office Action mailed Jan. 31, 2012 issued in corresponding Japanese Patent Application No. 2008-076433.

* cited by examiner

*Primary Examiner* — Andrew Caldwell
*Assistant Examiner* — Benjamin Geib
(74) *Attorney, Agent, or Firm* — Staas & Halsey LLP

(57) ABSTRACT

An information processing device disclosed includes a plurality of executing units for executing various processes. The information processing device and method thereof acquire setting information that indicates an operating condition with respect to each executing unit from information an operation of a main process executed by the plurality of executing units, and sets an operating state of each of the executing units based on the acquired setting information.

6 Claims, 9 Drawing Sheets

FIG. 2

[NETWORK CONNECTION APPLICATION]
  OS: FIRST GUEST OS
  LAN I/F: SECOND LAN I/F, THIRD LAN I/F,
  FOURTH   LAN I/F

[USER AUTHENTICATION APPLICATION]
  OS: SECOND GUEST OS
  LAN I/F: FIFTH LAN I/F

[APPLICATION COOPERATION]
  SECOND LAN I/F-FIFTH LAN I/F
  PORT: 9002-9005

[GUEST OS COOPERATION]
  FIRST LAN I/F-THIRD LAN I/F: BRIDGE
  PORT: 9001-9003

SECOND LAN I/F-FIFTH LAN I/F: BRIDGE
  PORT: 9002-9005

FOURTH LAN I/F: EXTERNAL CONNECTION
  PORT: 9004

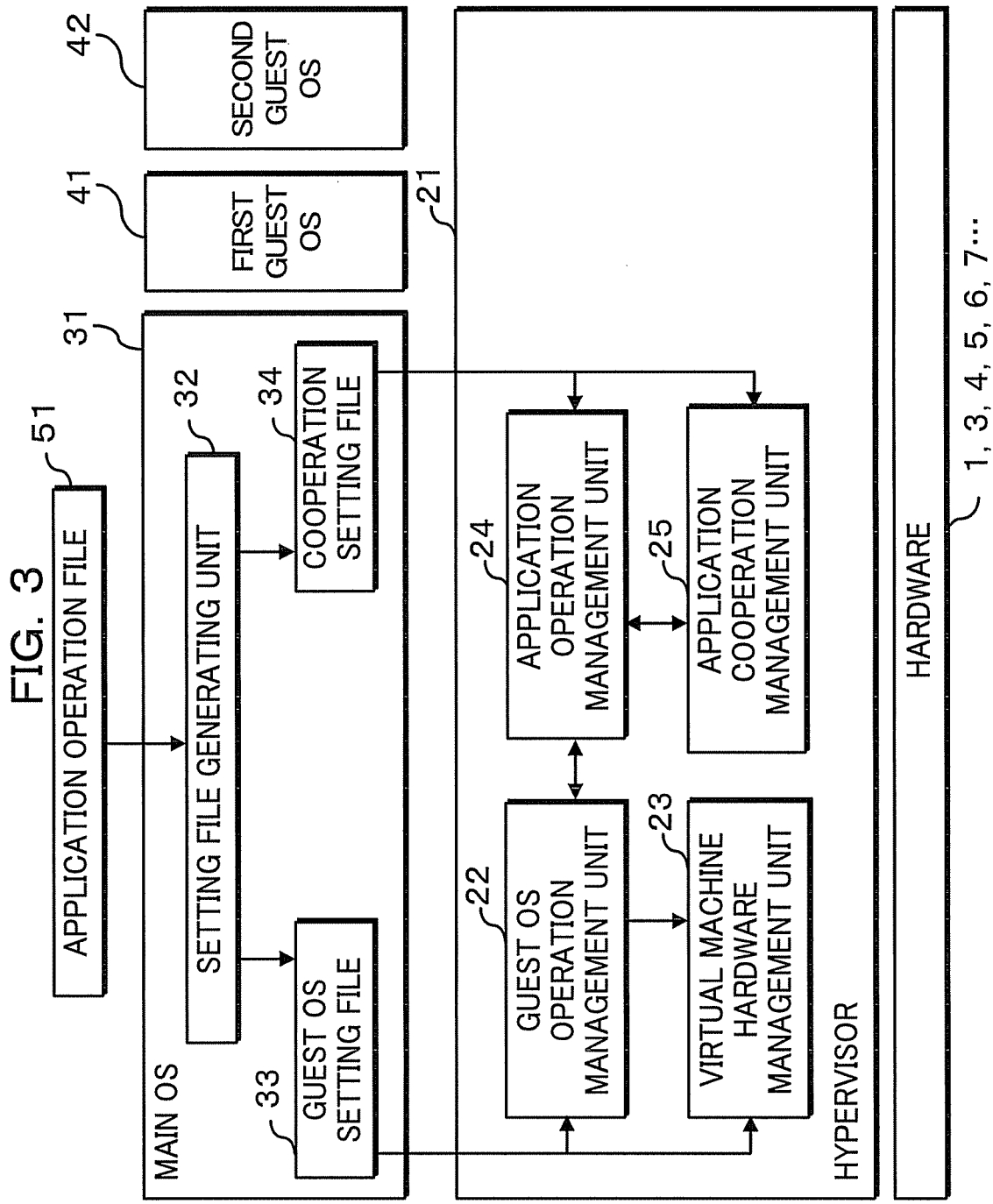

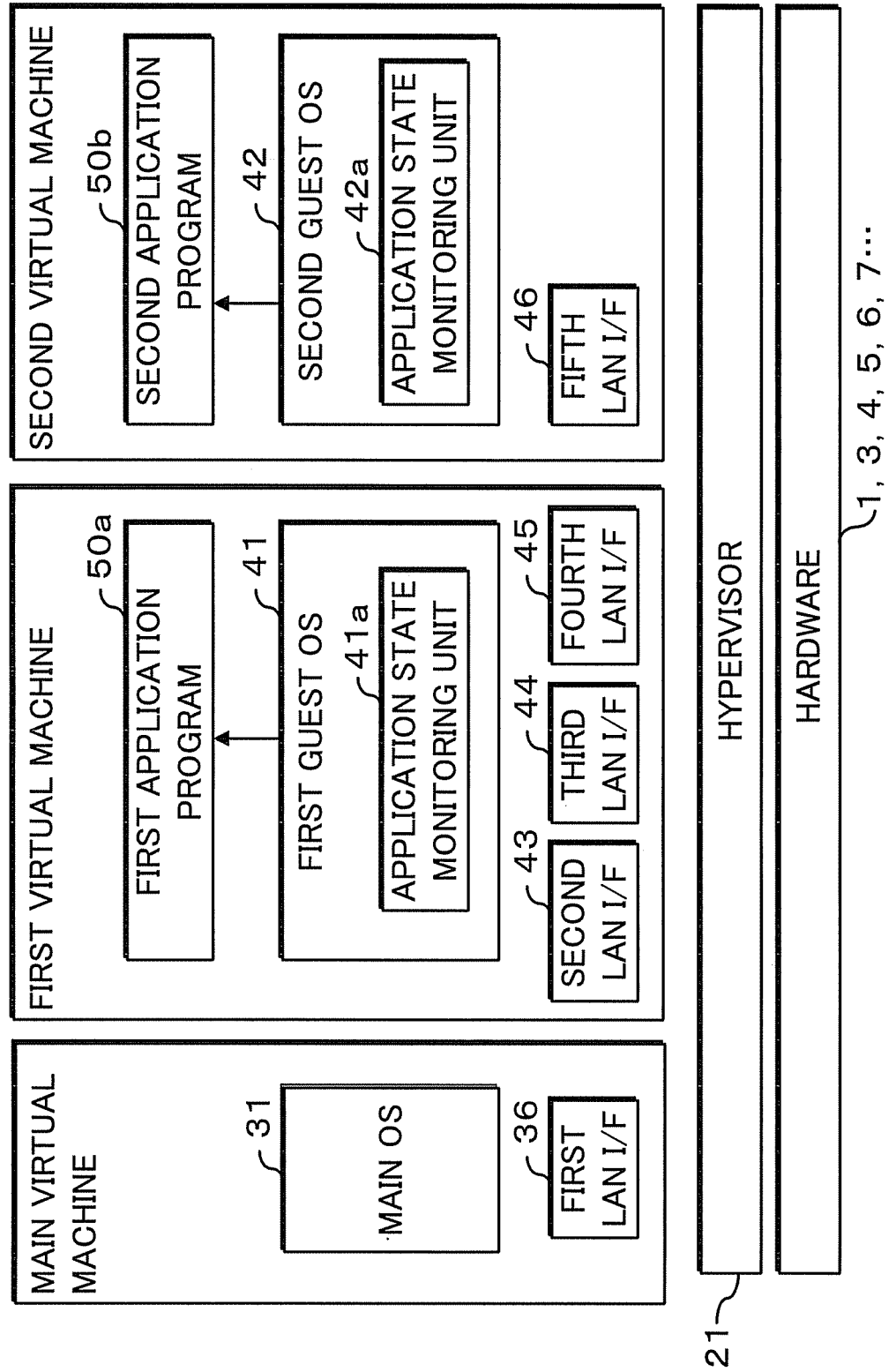

FIG. 5A

| VIRTUAL MACHINE ID | GUEST OS ID | VIRTUAL LAN I/F ID (PORT NUMBER) |
|---|---|---|
| FIRST VIRTUAL MACHINE | FIRST GUEST OS | SECOND LAN I/F ID (9002)<br>THIRD LAN I/F ID (9003)<br>FOURTH LAN I/F ID (9004) |
| SECOND VIRTUAL MACHINE | SECOND GUEST OS | FIFTH LAN I/F ID (9005) |

FIG. 5B

| COOPERATION INFORMATION ID | VIRTUAL LAN I/F ID (PORT NUMBER) | VIRTUAL LAN I/F ID (PORT NUMBER) |
|---|---|---|
| 1 | FIRST LAN I/F ID (9001) | THIRD LAN I/F ID (9003) |
| 2 | SECOND LAN I/F ID (9002) | FIFTH LAN I/F ID (9005) |
| 3 | FOURTH LAN I/F ID (9004) | NETWORK CARD |

FIG. 5C

| GUEST OS ID | APPLICATION ID | PRIORITY | PORT NUMBER |
|---|---|---|---|
| FIRST GUEST OS ID | FIRST APPLICATION | 1 | 9002 |
| SECOND GUEST OS ID | SECOND APPLICATION | 2 | 9005 |

INFORMATION PROCESSING DEVICE, INFORMATION PROCESSING METHOD, AND COMPUTER PRODUCT

CROSS-REFERENCE TO RELATED APPLICATIONS

This application is based upon and claims the benefit of priority of the prior Japanese Patent Application No. 2008-76433, filed on Mar. 24, 2008, the entire contents of which are incorporated herein by reference.

BACKGROUND

1. Field

The present invention relates to an information processing device, an information processing method, and a computer program to which a virtual technique is applied and which can provide operation virtually as a plurality of devices.

2. Description of the Related Art

An application program (hereinafter also referred to as application) is typically provided for each operating system (hereinafter referred to as OS).

Conventionally, one information processing device often has only one OS operated thereon, and in such a case, a user has to use different OSs of information processing devices for different applications used.

There is a system which makes a plurality of applications cooperate with each other to provide one service.

Such a system has a configuration that one application operates using an execution result of another application such that operation as the whole system is achieved.

If all applications can be executed by the same OS in such a system, the service can be provided by a single information processing device.

However, if applications are designed for different OSs, a plurality of information processing devices are required corresponding to the respective applications.

Accordingly, virtual techniques have become popular in which one information processing device is logically divided such that it can acts as a plurality of virtually independent information processing devices (virtual machines) (for example, see Japanese Patent-Laid Open No. 2005-157786).

Since operations of a plurality of virtual machines are implemented by a single information processing device as described above, the single information processing device can provide a system implemented by cooperation of a plurality of applications executed on different OSs.

In addition, by this configuration, operational cost of the system can be reduced compared to the system using a plurality of information processing devices.

As microprocessor technologies improve, a virtual technique as described above is more often applied not only to a super computer and a server computer but also to a personal computer (hereinafter referred to as PC).

Since different OSs execute respective applications in an information processing device using the virtual technique, an operating environment of each application do not affect an operating environment of a different application.

In addition, since abnormal termination of one OS does not affect an application executed by another OS, system quality can be improved.

SUMMARY

An information processing device disclosed in the present invention includes a plurality of executing units executing various processes. The information processing device acquires setting information that indicates an operating condition with respect to each of the executing units from information about an operation of a main process executed by the plurality of executing units, and sets an operating state of each of the executing units based on the acquired setting information.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 is a schematic diagram illustrating a content of an application operation file;

FIG. 3 is a functional block diagram illustrating function(s) of an information processing device;

FIG. 4 is a functional block diagram illustrating function(s) of an information processing device;

FIGS. 5A, 5B and 5C are schematic diagrams illustrating contents of a guest OS setting file and a cooperation setting file;

DETAILED DESCRIPTION OF EMBODIMENTS

Figure 1:
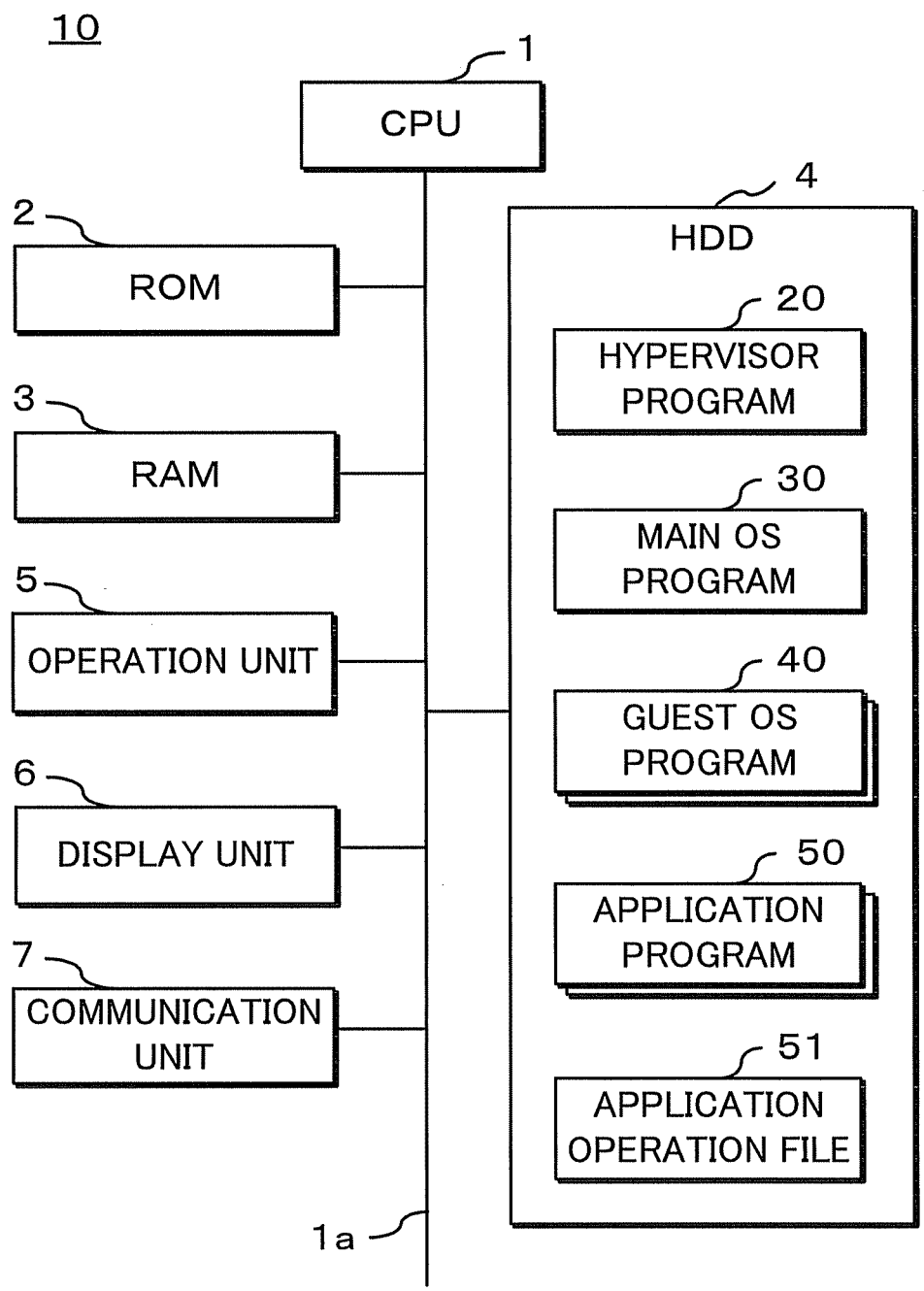
FIG. 1 is a block diagram illustrating a configuration of an information processing device according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

As described above, in an information processing device using a virtual technique, applications which are appropriate for a plurality of virtually independent virtual machines respectively can be executed, and therefore a system implemented by cooperation of a plurality of applications can be operated by such a single information processing device.

However, for operation of such a system, a user needs to perform various kinds of setting processing and startup processing independently in order to make applications executed by respective virtual machines cooperate with each other. This is inconvenient and causes the heavy operational load on the user.

For example, for starting up the system, a user needs to set operating conditions in each virtual machine such that applications to be executed by respective virtual machines cooperate, and start up each virtual machine according to the set conditions and then start up each application for each virtual machine after the startup of each virtual machine.

For terminating the system, the user needs to terminate an application in each virtual machine, and terminate each virtual machine after the termination of each application.

An object of an embodiment is to provide an information processing device, an information processing method, and a computer program using which a user does not need to perform various kinds of setting processing and startup processing independently in order to make applications executed by respective virtual machines cooperate with each other in a system implemented by cooperation of a plurality of applications, so that the operational load on the user can be reduced and convenience can be improved.

In an information processing device according to an embodiment, since operation condition(s) with respect to each of the executing units and cooperation information between sub-processes in each of the executing units are not required to be set independently, a user who will execute an application of the main process generates information only about operation of the main process, and therefore the operational load on the user can be reduced.

Hereinafter, an information processing device according to the present invention will be described in detail with reference to the drawings illustrating an embodiment of the information processing device.

FIG. 1 is a block diagram illustrating a configuration of an information processing device according to an embodiment of the present invention.

The information processing device 10 of an embodiment is implemented by a computer program according to the present invention, for example, being read and executed by a PC. However, the present invention is not limited to being executed by a PC. For example, any or all of operation(s) described herein may be implemented by the information processing device 10 which may be a dedicated device specialized to perform operation(s) described herein.

The information processing device 10 of an embodiment has various parts of hardware including a CPU 1, a Read Only Memory (ROM) 2, a Random Access Memory (RAM) 3, a Hard Disk Drive (HDD) 4, an operation unit 5, a display unit 6, and a communication unit 7, which are interconnected though a bus 1a.

The CPU 1 reads a control program stored in the ROM 2 or HDD 4 into the RAM 3 to execute the control program as necessary, and controls operation of the above described parts of the hardware.

The CPU 1 reads a hypervisor program 20, a main OS program 30, a guest OS program 40, which are stored in the HDD 4 as described in detail below, into the RAM 3 and executes them respectively, so that it acts as a hypervisor 21, a main OS 31, and guest OSs 41, 42 (see FIGS. 3, 4).

The CPU 1 acts logically as a plurality of CPUs 1 by executing the hypervisor program 20.

The CPU 1 may be a multi-core CPU, and may be designed optimally such that the hypervisor 21, the main OS 31, and the guest OSs 41, 42 are assigned to and operate on physically different CPU cores respectively.

The CPU 1 is not necessarily a multi-core CPU and may be a single-core CPU.

The ROM 2 prestores various control program(s) required for operating the information processing device 10 of an embodiment as an information processing device of the present invention.

The RAM 3 may be, for example, a Static RAM (SRAM), a Dynamic RAM (DRAM), or a flash memory, and that temporarily stores various data including data generated during execution of the control programs by the CPU 1.

The HDD 4 is a high capacity storage device.

The HDD 4 stores various control program(s) required for operating the information processing device 10 of an embodiment as the information processing device of the present invention, an application operation file 51 as shown in FIG. 2, various data, and the like.

In addition, the HDD 4 stores, as control programs to be read and executed by the CPU 1, the hypervisor program 20, the main OS program 30, the guest OS program 40, an application program 50, and the like.

The hypervisor program 20, also called virtual machine monitor (VMM), is a software program, for example, providing a virtual computer hardware platform environment which allows a plurality of OSs (main OS 31, guest OSs 41, 42) to run on the information processing device 10 concurrently.

The CPU 1 executes the hypervisor program 20 to act as the hypervisor 21 (FIGS. 3 and 4), thereby providing a virtual environment in which the information processing device 10 acts logically as a plurality of information processing devices.

This allows a plurality of logically independent virtual machines to operate in the information processing device 10.

Thu CPU 1 acts as the hypervisor 21 and thereby provides management between software and hardware resources and performs assignment of respective part of hardware to each OS (for example, main OS 31, guest OSs 41, 42) and basic control of hardware corresponding to each OS.

In addition, the hypervisor 21 reads out and executes the corresponding guest OS program 40 according to an instruction from the main OS 31, thereby starting up the guest OSs 41, 42.

In this case, the hypervisor 21 performs assignment control or the like of the hardware used by the guest OSs 41, 42, that is, the RAM 3, the HDD 4, the operation unit 5, the display unit 6, and the communication unit 7.

Also, CPU core units of the CPU 1 are assigned to the hypervisor 21 itself, the main OS 31, and the guest OSs 41, 42 respectively.

The RAM 3 is also used for storing each setting information of the main OS 31 and guest OSs 41, 42 when the CPU 1 acts as the main OS 31 and guest OSs 41, 42.

Therefore, the RAM 3 is also logically divided by the hypervisor 21 into a plurality of RAMs 3, which are assigned to the hypervisor 21, the main OS 31, and the guest OSs 41, 42 respectively.

The main OS program 30 and the guest OS program 40 are OS software such as Windows (R) or Linux having a Command User Interface (CUI) and a Graphic User Interface (GUI) using which a user can operate.

The CPU 1 acts as the main OS 31 by executing the main OS program 30, and functions as one of the executing units for executing various processes.

The main OS program 30 generates a display screen including a CUI and a GUI to be displayed depending on an executed process, and displays the screen on the display unit 6.

The main OS 31 accepts a control signal from the operation unit 5, and executes any type of process depending on the accepted control signal.

When the information processing device 10 is powered on and the startup of each part of hardware of the information processing device 10 is completed, the CPU 1 executes the hypervisor program 20 and the main OS program 30, thereby starting operation of the hypervisor 21 as well as providing a user with an operating environment of the main OS 31 (a main virtual machine).

The CPU 1 acts as the guest OSs 41, 42 by executing the guest OS program 40, and functions as one of the executing units for executing various processes.

The guest OS program 40 generates a display screen including a CUI and a GUI to be displayed depending on an executed process, and displays the screen on the display unit 6.

The hypervisor 21 is enabled to provide a user with an operating environment of the guest OSs 41, 42 (a virtual machine) by executing the guest OS program 40 according to an instruction from the main OS 31 to start up the guest OSs 41, 42.

The hypervisor 21 has function(s) of maintaining normal operation(s) of each guest OS 41, 42, for example, a function of controlling startup and termination of each guest OS 41, 42, a function of assigning hardware to each guest OS 41, 42, a function of making each guest OS 41, 42 execute an appropriate application, and a function of managing an operating state of an application executed by each guest OS 41, 42.

In addition, the hypervisor 21 has a relay function to connect the guest OSs 41 and 42, a relay function to connect each guest OS 41, 42 with an external network, and the like.

The application program 50 is a software program executed by the main OS 31 or the guest OSs 41, 42.

The application program 50 may be read by the information processing device 10 through an external memory (not shown) or the communication unit 7 and stored into the HDD 4.

The application operation file 51 may be created by a user using the information processing device 10, or may be created by a user using an external device, read by the information processing device 10 through an external memory (not shown) or the communication unit 7, and stored in the HDD 4.

The operation unit 5 includes a keyboard, a mouse or the like, and has various operation keys required for a user to operate the information processing device 10.

When an operation key is operated by a user, the operation unit 5 transmits a control signal corresponding to the operation key to the CPU 1 (for example, main OS 31).

The CPU 1 (for example, main OS 31) then executes a process corresponding to the control signal acquired from the operation unit 5.

The display unit 6 is a liquid crystal display, a Cathode Ray Tube (CRT) display, or the like.

The display unit 6 displays, according to an instruction from the CPU 1 (for example, main OS 31, guest OSs 41, 42), an operating state of the information processing device 10, information inputted from the operation unit 5, information of which a user should be notified, and the like.

The communication unit 7 has, for example, a network card, and includes hardware for communication with an external device through a network such as a Local Area Network (LAN).

FIG. 2 is a schematic diagram illustrating a content of an application operation file such as the application operation file 51.

The present invention will be described in detail below through an example in which a user who is using an operating environment of the main OS 31 causes the main OS 31 to execute a network connection application for connection to a LAN.

The network connection application as used herein is software which executes a user authentication application for authenticating a user, and makes a connection to a LAN when a user is authenticated.

Further, it is assumed that the network connection application is an application for the first guest OS 41 and the user authentication application is an application for the second guest OS 42, and thus the two applications are not applications for the main OS 31.

The main OS 31, guest OSs 41, 42 may be different OSs, for example, Windows Vista, Windows XP, and Linux, respectively.

As shown in FIG. 2, in the application operation file 51, there is described application information including information of the guest OSs 41, 42 to be executed, information of a virtual LAN interface (virtual LAN I/F) to be assigned to the guest OSs 41, 42, and the like with respect to each application to be executed.

Further, in the application operation file 51, there are described application cooperation information indicating cooperation between applications executed respectively by the guest OSs 41 and 42, and guest OS cooperation information indicating cooperation between the guest OSs 41 and 42.

As mentioned, the application operation file 51 may be created by a user in accordance with a predetermined rule before the network connection application is executed.

Hereinafter, there will be described functions implemented by the CPU 1 executing the various control programs stored in the ROM 2 or the HDD 4 in the information processing device 10 configured as described above.

FIGS. 3 and 4 are a functional block diagrams illustrating function(s) of the information processing device 10.

FIGS. 3 and 4 illustrate a principle by which an information processing device acts as a plurality of information processing devices by the virtual technique according to an embodiment.

FIGS. 3 and 4 show that, in the information processing device 10, each of the main OS 31 (main virtual machine) and guest OSs 41, 42 (virtual machines) are allowed to be independently executed by operation of the hypervisor 21 on the hardware including the CPU 1, the RAM 3, the HDD 4, the operation unit 5, the display unit 6, the communication 7, and the like.

In the information processing device 10 of an embodiment, the CPU 1 implements function(s) of the hypervisor 21, main OS 31, guest OSs 41, 42, and the like by executing the various control programs stored in the ROM 2 or the HDD 4.

The hypervisor 21 has functions of a guest OS operation management unit 22, a virtual machine hardware management unit 23, an application operation management unit 24, an application cooperation management unit 25, and the like by using modules included in the hypervisor program 20.

The main OS 31 includes a function of a setting file generating unit 32 by using a module included in the main OS program 30.

The guest OSs 41 and 42 include functions of application state monitoring unit 41a and 42a (FIG. 4) by using corresponding modules included in the guest OS program 40, respectively.

In the information processing device 10 of an embodiment, a user who are using an operating environment of the main OS 31 (main virtual machine) instructs the main OS 31 to execute the network connection application when the user wants to connect the information processing device 10 to a LAN.

The main OS 31 reads the application operation file 51 in which information about operation of the network connection application (service of the main process) is described, from the HDD 4 into the RAM 3 assigned to the main OS itself.

Then, the setting file generating unit (a setting information acquiring unit, a cooperation information acquiring unit) 32 of the main OS 31 generates a guest OS setting file 33 and a cooperation setting file 34 (FIG. 3) from the application operation file 51 read into the RAM 3 assigned to the main OS itself.

FIG. 5 is a schematic diagram illustrating content(s) of a guest OS setting file such as the guest OS setting file 33 and the cooperation setting file such as the cooperation setting file 34.

FIG. 5A shows a virtual machine information table included in the guest OS setting file 33, and FIG. 5B shows a cooperation information table included in the guest OS setting file 33.

FIG. 5C shows the cooperation setting file 34.

In the virtual machine information table of the guest OS setting file 33, setting information indicating operating conditions with respect to the guest OSs 41, 42 is described.

Specifically, as shown in FIG. 5A, in the virtual machine information table, there is described virtual machine information, with respect to each virtual machine, including a virtual machine ID (IDentifier) for identifying a virtual machine, a guest OS ID for identifying a guest OS in a virtual machine, a virtual LAN I/F ID for identifying a virtual LAN I/F, a port number of a respective virtual LAN I/F, and the like.

In the cooperation information table of the guest OS setting file 33, cooperation information indicating a cooperation (connection) relation between the guest OSs 41 and 42 is described.

Specifically, as shown in FIG. 5B, in the cooperation information table, there are described with respect to each cooperation information's ID, a virtual LAN I/F ID and a port number of each of two virtual LAN I/Fs which are associated (connected) between virtual machines.

The cooperation file 34 includes cooperation information indicating a relationship between applications (sub-processes) executed by the respective guest OSs 41 and 42.

Specifically, as shown in FIG. 5C, in the cooperation setting file 34, there are described with respect to each of the guest OSs 41, 42, a guest OS ID, an application ID for identifying an application executed by a respective guest OS, a priority of the application, and a port number of a virtual LAN I/F associated (connected) with another virtual machine (guest OS 41, 42) for cooperation between applications.

The setting file generating unit 32 generates virtual machine information for each application information described in the application operation file 51 and registers the generated information in the guest OS setting file 33.

For example, the setting file generating unit 32 generates virtual machine information indicating a first virtual machine including the first guest OS 41, a second LAN I/F 43, a third LAN I/F 44, and a fourth LAN I/F 45 and registers the virtual machine information in the guest OS setting file 33 based on first application information described in the application operation file 51.

In addition, the setting file generating unit 32 associates a guest OS ID of the first guest OS 41 with an application ID of the network connection application (first application) and registers them in the cooperation setting file 34 based on the first application information described in the application operation file 51.

Then, the setting file generating unit 32 generates virtual machine information indicating a second virtual machine including the second guest OS 42 and a fifth LAN I/F 46 and registers the virtual machine information in the guest OS setting file 33 based on second application information described in the application operation file 51.

In addition, the setting file generating unit 32 associates a guest OS ID of the second guest OS 42 with an application ID of the user authentication application (second application) and registers them in the cooperation setting file 34 based on the second application information described in the application operation file 51.

In an embodiment, a priority order of registration in the cooperation setting file 34 is an order of description of application information of applications in the application operation file 51.

Therefore, the priority of the network connection application whose application information is described first in the application operation file 51 is first, and the priority of the user authentication application whose application information is described second is second.

However, a priority may be described for each application in the application operation file 51, for example, and in this case, priorities described in the application operation file 51 may be priorities registered in the cooperation setting file 34.

Next, the setting file generating unit 32 registers, with respect to each of the guests OSs 41, 42, a port number assigned to LAN I/F 43, 46 associated with another guest OS 41, 42 in the cooperation setting file 34 based on application cooperation information described in the application operation file 51.

In the application operation file 51 shown in FIG. 2, application cooperation information is described in which the second LAN I/F 43 of the port number 9002 is associated with the firth LAN I/F 46 of the port number 9005.

Therefore, the setting file generating unit 32 registers 9002, 9005 in port number fields corresponding to the guest OSs 41, 42 of the cooperation setting file 34 respectively.

Further, the setting file generating unit 32 generates cooperation information indicating a cooperation relationship between the guest OSs 41 and 42 (virtual machines) and registers the generated information in the cooperation information table of the guest OS setting file 33 based on guest OS cooperation information described in the application operation file 51.

In the application operation file 51 shown in FIG. 2, guest OS cooperation information is described in which the first LAN I/F 36 of the port number 9001 is associated with the third LAN I/F 44 of the port number 9003.

Therefore, the setting file generating unit 32 registers cooperation information whose cooperation information ID is 1 indicating a cooperation relationship between the first LAN I/F 36 and the third LAN I/F 44 in the cooperation information table of the guest OS setting file 33.

Similarly, in the cooperation information table of the guest OS setting file 33, the setting file generating unit 32 registers cooperation information whose cooperation information ID is 2 indicating a cooperation relationship between the second LAN I/F 43 and the fifth LAN I/F 46 and cooperation information whose cooperation information ID is 3 indicating a cooperation relationship between the fourth LAN I/F 45 and the external network.

As information indicating an external network, a Media Access Control (MAC) address assigned to a network card of the communication unit 7 may be used for example.

The main OS 31 transmits the guest OS setting file 33 and cooperation setting file 34 generated by the setting file generating unit 32 to the hypervisor 21.

The hypervisor 21 inputs the guest OS setting file 33 acquired from the main OS 31 to the guest OS operation management unit 22 and the virtual machine hardware management unit 23, and inputs the cooperation setting file 34 to the application operation management unit 24 and the application cooperation management unit 25.

The guest OS operation management unit 22 of the hypervisor 21 executes the corresponding guest OS program 40 based on the content of the virtual machine information table of the guest OS setting file 33 to start up the guest OSs 41, 42.

The virtual machine hardware management unit 23 of the hypervisor 21 assigns a corresponding virtual LAN I/F 43, 44, 45, 46 to the guest OS 41, 42 started up by the guest OS operation management unit 22 based on the content of the virtual machine information table of the guest OS setting file 33.

In addition, the virtual machine hardware management unit 23 bridges virtual LAN I/Fs to be associated with each other based on the content of the cooperation information table of the guest OS setting file 33.

Thereby, the hypervisor (setting unit) 21 can start up each virtual machine corresponding to virtual machine information registered in the virtual machine information table of the guest OS setting file 33.

In addition, virtual machines which should cooperate can be associated with each other based on the cooperation information registered in the cooperation information table of the guest OS setting file 33.

The application state monitoring unit (monitoring unit) 41a, 42a of the guest OSs 41, 42 monitor operating states of respective applications executed by the guest OSs 41, 42, and notify a monitoring result to the application cooperation management unit 25 of the hypervisor 21.

Specifically, the application state monitoring unit 41a monitors an operating state of the first application program (network connection application) 50a executed by the first guest OS 41, and notifies the application cooperation management unit 25 of the monitoring result.

On the other hand, the application state monitoring unit 42a monitors an operating state of the second application program (user authentication application) 50b executed by the second guest OS 42, and notifies the application cooperation management unit 25 of the monitoring result.

In the configuration of an embodiment, modules for implementing the application state monitoring units 41a, 42a are included in the guest OS program 40, and the application state monitoring units 41a, 42a are started up when the guest OSs 41, 42 are started up.

In an alternative configuration, for example, modules for implementing the application state monitoring units 41a, 42a are stored in the HDD 4 separately from the guest OS program 40, and after the startup of the guest OSs 41, 42, the modules are loaded from the HDD 4 and executed by the guest OSs 41, 42.

If the application state monitoring units 41a, 42a are started up when the guest OSs 41, 42 are started up (start to operate), the application state monitoring units 41a, 42a notify this fact to the application cooperation management unit 25 of the hypervisor 21, respectively.

When the application cooperation management unit 25 of the hypervisor 21 confirms the completion of the startup of the application state monitoring units 41a, 42a of the guest OSs 41, 42, the application cooperation management unit 25 notifies this fact to the application operation management unit 24.

When the application operation management unit 24 confirms the completion of the startup of the guest OSs 41, 42 and the application state monitoring units 41a, 42a of the guest OSs 41, 42, the application operation management unit 24 causes the guest OSs 41, 42 to start up the respective application programs 50a, 50b based on the content of the cooperation setting file 34.

Specifically, the application operation management unit 24 identifies application(s) the priority of which is first in the registration of the cooperation setting file 34 and the guest OSs 41, 42 for executing respective applications.

Then, the application operation management unit 24 causes the identified guests OS 41, 42 to start up the identified application programs 50a, 50b.

In this example, the first guest OS 41 is caused to start up the network connection application 50a as the application having the first priority.

The application operation management unit 24 determines whether the startup of the network connection application 50a is completed or not based on a monitoring result sent from the application state monitoring unit 41a of the first guest OS 41, while waiting for the completion of the startup of the network connection application 50a.

If the startup of the network connection application 50a is completed, the application operation management unit 24 identifies an application the priority of which is next highest and a guest OS 41, 42 for executing this application.

In this example, the user authentication application 50b as an application having the second priority and the second guest OS 42 for executing the user authentication application 50b are identified, and the second guest OS 42 is caused to start up the user authentication application 50b.

The application operation management unit 24 determines whether the startup of the user authentication application 50b is completed or not based on a monitoring result sent from the application state monitoring unit 42a of the second guest OS 42, while waiting for the completion of the startup of the user authentication application 50b.

The application operation management unit 24 repeats the above described process until the startup of all the application programs 50 registered in the cooperation setting file 34.

If the startup of all the application programs 50 are completed, the application operation management unit 24 inquires of the application state monitoring unit 41a of the first guest OS 41 for executing the application having the first priority, whether a communication channel between the first guest OS 41 and another guest OS 42 for executing another application is reserved or not.

If the application operation management unit 24 is notified by the application state monitoring unit 41a that the communication channel is reserved, the application operation management unit 24 notifies the application cooperation management unit 25 of this fact.

When the communication channel between the first guest OS 41 and the second guest OS 42 is reserved, applications 50a and 50b to be executed by the first guest OS 41 and the second guest OS 42 respectively are allowed to cooperate, and thus a process by the applications 50a, 50b can be started.

That is, in this example, the first guest OS 41 starts the execution of the network connection application 50a and the second guest OS 42 starts the execution of the user authentication application 50b, thereby starting the execution of the network connection application 50a including the user authentication application 50b.

The application cooperation management unit 25 gets the operating states of the network connection application 50a and the user authentication application 50b based on monitoring results from the application state monitoring units 41a, 42a, and relays processing results of the network connection application 50a and the user authentication application 50b between the guest OSs 41 and 42.

The application cooperation management unit 25 causes the guest OSs 41, 42 to execute the applications 50a, 50b respectively according to the cooperation setting file 34, and thereby acts as a control unit for executing the network connection application 50a including the user authentication application 50b (the main process).

According to the above described process, when a user gives an instruction to start the network connection application 50a, the first guest OS 41 can be caused to execute the network connection application 50a and the second guest OS 42 can be caused to execute the user authentication application 50b while the guest OSs 41, 42 is started up.

Therefore, operation for starting up the guest OSs 41, 42 independently and operation for starting up the application programs 50a, 50b independently are not required, although these are required conventionally.

Accordingly, the user operability can be improved.

Hereinafter, there will be described a process executed by the hypervisor 21 in a case where, the application programs 50a, 50b are terminated while the guest OSs 41, 42 are cooperating and executing the respective application programs 50a, 50b as described above.

First, a process will be described in a case where an instruction to terminate the network connection application 50a is given by a user.

When the user gives an instruction to terminate the network connection application 50a through the operation unit 5 in the operating environment of the main OS 31, the hypervisor 21 accepts the instruction to terminate the network connection application 50a through the main OS 31.

The application operation management unit 24 of the hypervisor 21 identifies an application having the lowest priority based on the content of the cooperation setting file 34 and terminates the identified application.

In this example, the user authentication application 50b having the second priority is identified and terminated.

The application operation management unit 24 determines whether the user authentication application 50b has been terminated or not based on a monitoring result sent from the application state monitoring unit 42a of the second guest OS 42, while waiting for the termination of the user authentication application 50b.

If the user authentication application 50b has been terminated, the application operation management unit 24 identifies an application having the next lowest application and terminates the identified application.

In this example, the network connection application 50a having the first priority is identified and terminated.

The application operation management unit 24 determines whether the network connection application 50a has been terminated or not based on a monitoring result sent from the application state monitoring unit 41a of the first guest OS 41, while waiting for the termination of the network connection application 50a.

The application operation management unit 24 repeats the above described process until the termination of all the application programs 50 registered in the cooperation setting file 34.

If all the application programs 50 are terminated, the application operation management unit 24 notifies the guest OS operation management unit 22 of this fact.

When the guest OS operation management unit 22 is notified by the application operation management unit 24 that all the application programs 50 are terminated, the guest OS operation management unit 22 terminates operation of the guest OSs 41, 42, and cancels the assignment of parts of the hardware to the guest OSs 41, 42.

According to the above described process, when a user terminates the network connection application 50a, not only the network connection application 50a executed by the first guest OS 41 but also the user authentication application 50b executed by the second guest OS 42 can be terminated.

At the same time, the first guest OS 41 and the second guest OS 42 can also be terminated.

Therefore, operation for terminating the application programs 50a, 50b independently and operation for terminating the guest OSs 41, 42 independently are not required, although these are required conventionally.

Accordingly, the user operability can be improved.

Next will be described a process executed by the hypervisor 21 when any of application programs 50 is terminated abnormally for some reason.

The application operation management unit 24 of the hypervisor 21 monitors the operating states of the application programs 50a, 50b based on monitoring results from the application state mentoring units 41a, 42a.

When the application operation management unit 24 is notified by any of the application state monitoring units 41a, 42b that the application programs 50a, 50b are terminated, the application operation management unit 24 determines whether or not, of the currently operating application programs 50a, 50b, there is an application whose priority is higher than priorities of the terminated application programs 50a, 50b.

If the application operation management unit 24 determines that there is no application whose priority is higher than priorities of the terminated application programs 50a, 50b, the application operation management unit 24 terminates all the application programs 50a, 50b.

This is because the termination of the applications is probably due to an instruction from a user.

As for the procedure of termination of all the application programs 50a, 50b, the applications are terminated in order of priority from lowest based on the content of the cooperation setting file 34 as described above.

After the termination of ail the application programs 50a, 50b, the guest OS operation management unit 22 terminates operations of all the guest OSs 41, 42, and cancels the assignment of parts of the hardware to the guest OSs 41, 42.

On the other hand, if there is an application whose priority is higher than priorities of the terminated application programs 50a, 50b, the application operation management unit 24 starts up the applications 50a, 50b again because it is highly likely that only the application programs 50a, 50b having a low priority are terminated abnormally for some reason.

In this example, since the network connection application 50a has the first priority, the terminated application is the user authentication application 50b.

The application operation management unit 24 determines whether the startup of the network connection application 50b is completed or not based on a monitoring result sent from the application state monitoring unit 42a, while waiting for the completion of the startup of the network connection application 50b.

If the startup of the application program 50b is completed, the application operation management unit 24 inquires of the application state monitoring unit 41a of the first guest OS 41 for executing the application having the first priority, whether a communication channel between the first guest OS 41 and another guest OS 42 for executing another application is reserved or not.

If the application operation management unit 24 is notified by the application state monitoring unit 41a that the communication channel is reserved, the application operation management unit 24 notifies the application cooperation management unit 25 of this fact, and the process by the applications 50a, 50b is restarted.

According to the above described process, even if any of the application programs 50 is terminated abnormally, only the terminated application program 50 is started up again, and therefore a process of another application program 50 is not affected by this termination.

Therefore, in an environment in which different application programs 50 are executed by different guest OSs 41, 42, an operating environment of each guest OS 41, 42 does not affect an operating environment of another guest OS 41, 42, so that each application program 50 can operate stably.

Hereinafter, there will be described with reference to flowcharts a process in which a plurality of OSs (guest OSs) are caused to execute different applications (sub-processes) in the information processing device 10 of an embodiment so that an application of the main process is executed by the information processing device 10.

Figure 6:
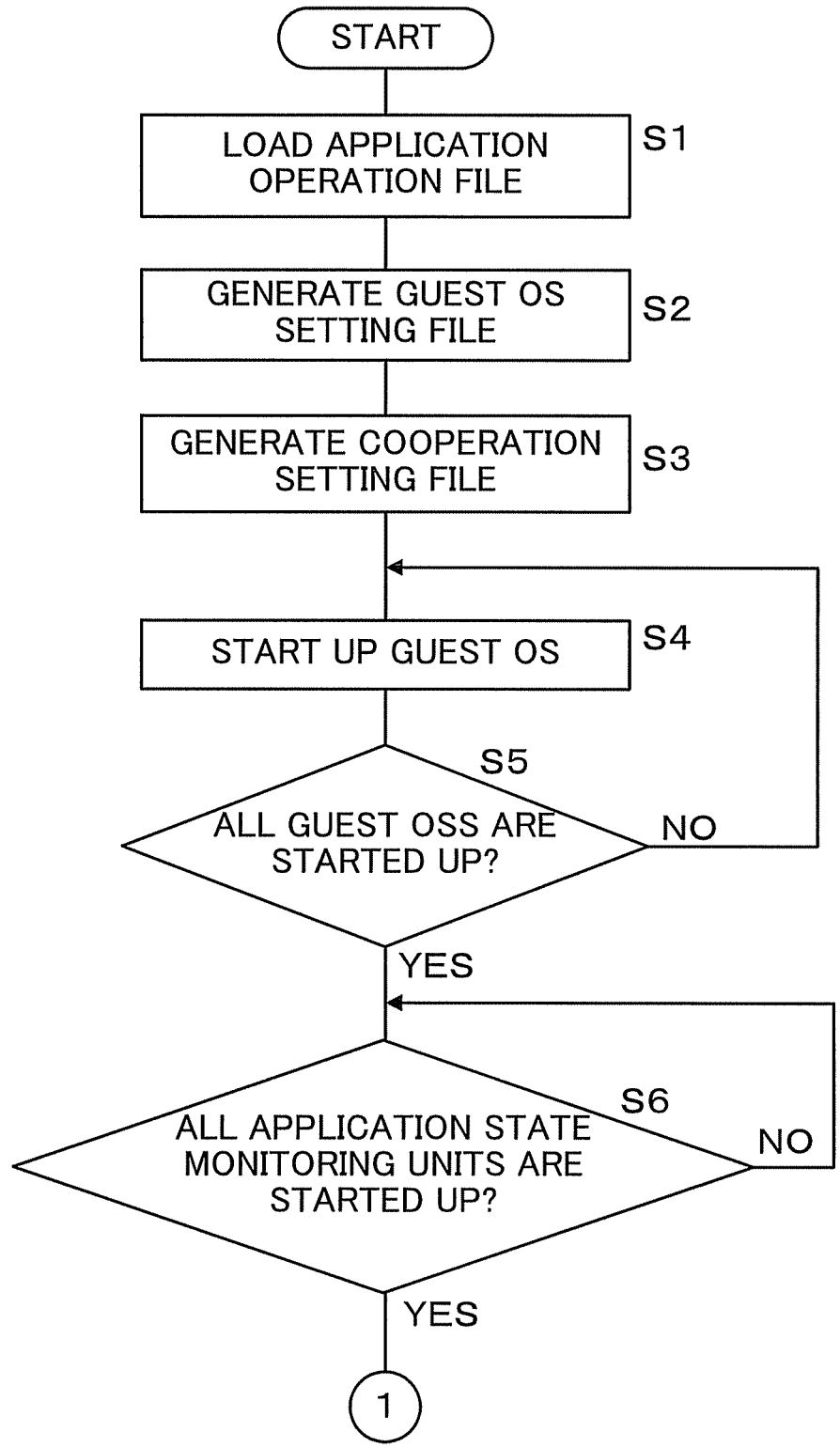
FIG. 6 is a flowchart illustrating a procedure of a process at the start of an application.
Figure 7:
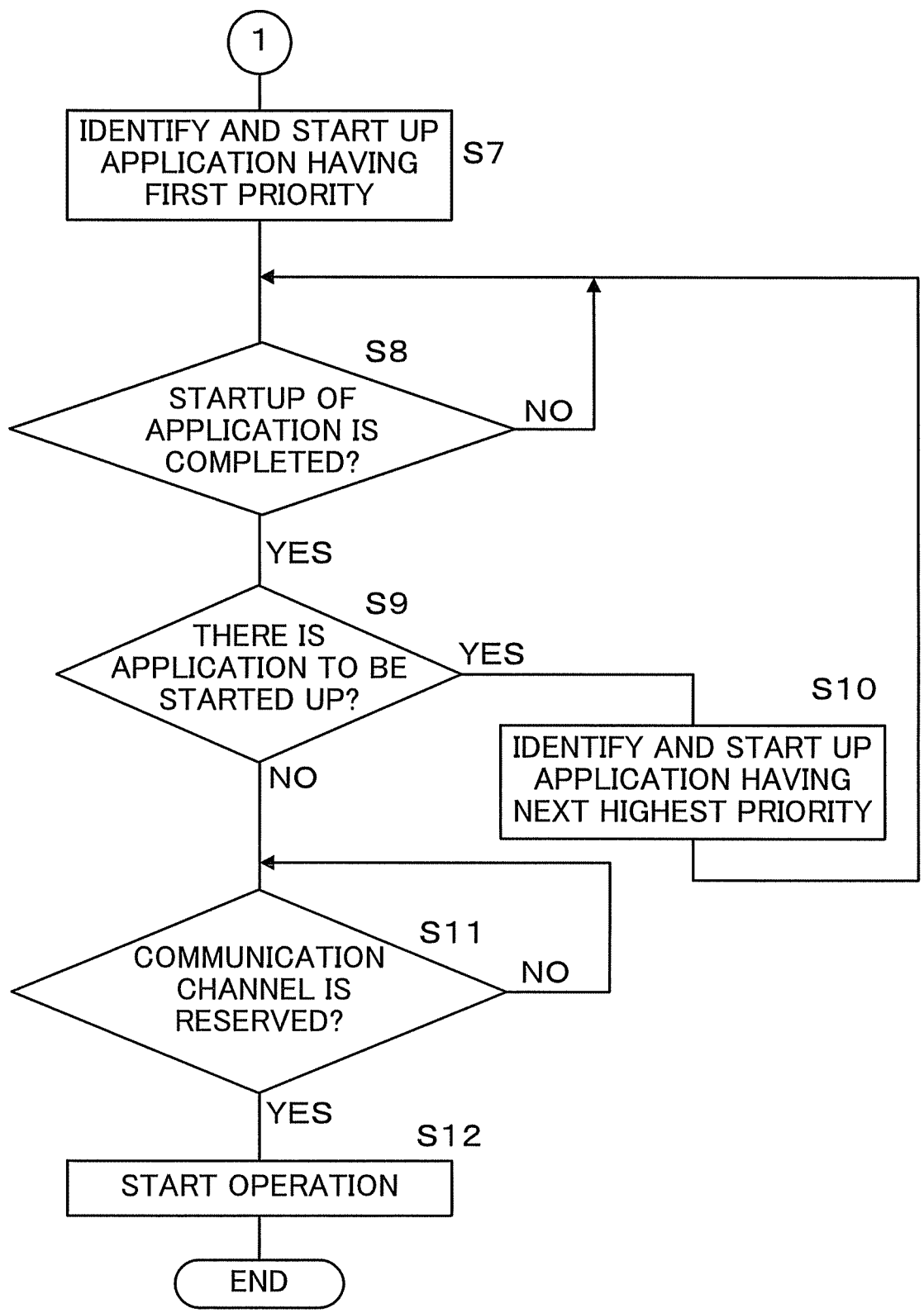
FIG. 7 is a flowchart illustrating a procedure of a process of an application.

FIGS. 6 and 7 are flowcharts illustrating procedure of a process at the start of an application.

The process described below is executed by the CPU 1 (hypervisor 21, main OS 31, guest OSs 41, 42, etc.) according to a control program stored in the ROM 2 or HDD 4 of the information processing device 10.

When the CPU 1 (for example, the main OS 31) of the information processing device 10 is instructed to execute an application of the main process by a user operating the operation unit 5, the CPU 1 loads the application operation file 51 corresponding to this application into the RAM 3 (S1).

The CPU 1 (for example, the setting file generating unit 32 of the main OS 31) generates the guest OS setting file 33 indicating an operating condition with respect to each of the guest OSs 41, 42, from the application operation file 51 loaded into the RAM 3 (S2).

In addition, the CPU 1 generates the cooperation setting file 34 including cooperation information indicating a relationship between applications executed respectively by the guest OSs 41, 42, from the application operation file 51 loaded into the RAM 3 (S3).

The CPU 1 (for example, the guest OS operation management unit 22 of the hypervisor 21) executes the respective guest OS program 40 to start up the guest OSs 41, 42 based on the generated guest OS setting file 33 (S4).

The CPU 1 (for example, the virtual machine hardware management unit 23) starts up the guest OSs 41, 42, and further assigns corresponding virtual LAN I/Fs 43, 44, 45, 46 to the started-up guest OSs 41, 42.

The CPU 1 determines whether all the guest OSs 41, 42 registered in the guest OS setting file 33 are started up or not (S5). If it is determined that all the guest OSs 41, 42 are not started up (S5: No), the CPU 1 returns to operation S4 and waits until all the guest OSs 41, 42 are started up.

If it is determined that all the guest OSs 41, 42 are started up (S5: Yes), the CPU 1 determines whether the application state monitoring unit 41a, 42a of the guest OSs 41, 42 are started up or not (S6).

If it is determined that the application state monitoring unit 41a, 42a are not started up (S6: No), the CPU 1 waits until all the application state monitoring unit 41a, 42a are started up.

If it is determined that all the application state monitoring unit 41a, 42a are started up (S6: Yes), the CPU 1 for example, (the application operation management unit 24) identifies an application 50 having the first priority based on the cooperation setting file 34, and causes the corresponding guest OS 41, 42 to start up the identified application 50 (S7).

The CPU 1 determines whether the startup of the application 50 having the first priority is completed or not based on a monitoring result sent from the application state monitoring unit 41a, 42a of the corresponding guest OS 41, 42 (S8).

If it is determined that the startup of the application 50 having the first priority is not completed (S8: No), the CPU 1 waits until the startup of the application 50 is completed.

If it is determined that the startup of the application 50 having the first priority is completed (S8: Yes), the CPU 1 determines whether or not there still is an application 50 to be started up based on the cooperation setting file 34 (S9).

If there is an application 50 to be started up (S9: Yes), the CPU 1 identifies an application 50 having the next highest priority (second priority in this example), based on the cooperation setting file 34 and causes the corresponding guest OS 41, 42 to start up the identified application 50 (S10).

The CPU 1 returns to operation S8, and determines whether the startup of this application 50 is completed or not (S8) while waiting for the completion of the startup of this application 50.

If there is no application 50 to be started up (S9: No), the CPU 1 inquires of the application state monitoring unit 41a (or 42a) of the guest OS 41 (or 42) for executing the application 50 having the first priority, whether a communication channel between the first guest OS 41 (or 42) and another guest OS 42 (or 41) for executing another application is reserved or not.

The CPU 1 determines whether the communication channel between the guest OSs 41 and 42 based on a response from the application state monitoring unit 41a (or 42a) (S11).

If the CPU 1 determines that the communication channel is not reserved (S11: No), the CPU 1 waits until the communication channel is reserved.

If the CPU 1 determines that the communication channel is not reserved (S11: Yes), the CPU 1 starts the operation of the application of the main process (S12), and terminates the process for starting the operation of the application of the main process.

Hereinafter, there will be described with reference to flowcharts a process executed by the information processing device 10 of an embodiment during execution of an application of the main process by a plurality of OSs (guest OSs) executing different applications (sub-processes) in the information processing device 10 as described above.

Figure 8:
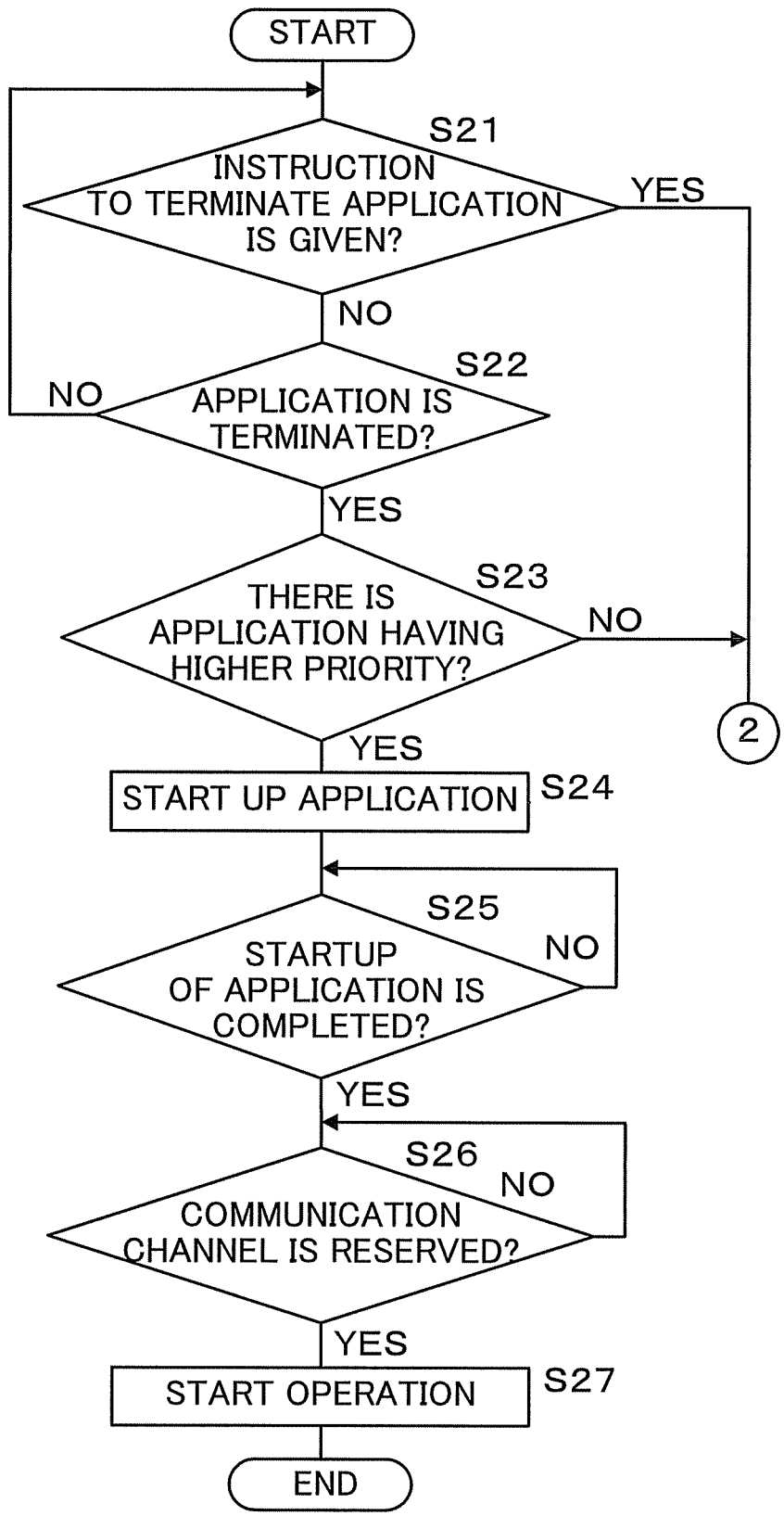
FIG. 8 is a flowchart illustrating a procedure of a process during execution of an application.
Figure 9:
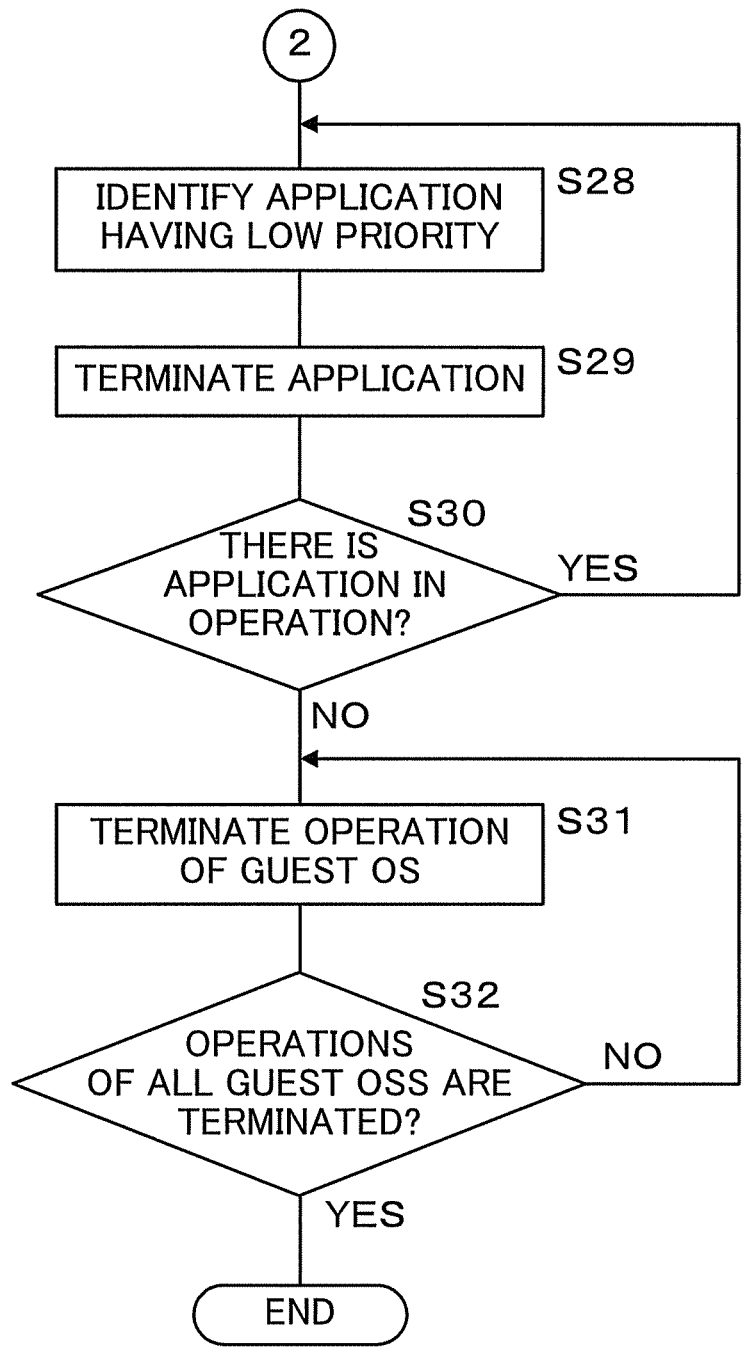
FIG. 9 is a flowchart illustrating a procedure of a process during execution of an application.

FIGS. 8 and 9 are flowcharts illustrating procedure of a process during execution of an application.

The process described below is executed by the CPU 1 (for example, hypervisor 21, main OS 31, guest OSs 41, 42, etc.) according to a control program stored in the ROM 2 or HDD 4 of the information processing device 10.

The CPU 1 (for example, the main OS 31) of the information processing device 10 determines whether or not it is instructed to terminate an application of the main process including by a user operating the operation unit 5 (S21). If the CPU 1 determines that it is instructed (S21: Yes), it proceeds to operation S28.

If the CPU 1 determines that it is not instructed to terminate the application (S21: No), the CPU 1 (for example, the application operation management unit 24 of the hypervisor 21) determines whether any of applications 50 is terminated or not based on a monitoring result sent from the application state monitoring units 41a, 42a (S22).

If it is determined that none of the application 50 is terminated (S22: No), the CPU 1 returns to operation S21.

If it is determined that any of the application 50 is terminated (S22: Yes), the CPU 1 determines whether or not, of the currently operating applications 50, there is an application 50 whose priority is higher than the priority of the terminated application 50 based on the cooperation setting file 34 (S23).

If it is determined that there is no application 50 whose priority is higher (S23: No), the CPU 1 proceeds to operation S28.

If it is determined that there is an application 50 whose priority is higher (S23: Yes), the CPU 1 starts up the terminate application 50 again (S24).

The CPU 1 determines whether the startup of the application 50 is completed or not based on a monitoring result sent from the application state monitoring unit 41*a* (or 42*a*) (S25). If it is determined that the startup is not completed (S25: No), the CPU 1 waits.

If the CPU 1 determines that the startup of the application 50 is completed (S25: Yes), the CPU 1 determines whether a communication channel between the guest OSs 41 and 42 is reserved or not (S26). If it is determined that the communication channel is not reserved (S26: No), the CPU 1 waits.

If it is determined that the communication channel is reserved (S26: Yes), the CPU 1 restarts the operation of the application of the main process (S27) and terminates the above described process.

If the CPU 1 determines that it is instructed to terminate the application (S21: Yes) or determines that there is no application 50 whose priority is higher (S23: No), the CPU 1 (the application operation management unit 24) identifies an application having the lowest priority 50 based on the cooperation setting file 34 (S28).

The CPU 1 terminates the identified application 50 (S29), and determines whether or not there is an application 50 still in operation (S30).

If it is determined that there is an application 50 in operation (S30: Yes), the CPU 1 returns to the operation S28 and identifies an application having the next lowest priority (S28), and then terminates the identified application (S29).

The CPU 1 repeats the process from operation S28 to operation S30 until all of applications 50 in operation are terminated, and if it is determined that there is no application 50 in operation (S30: No), the CPU 1 terminates operations of all the guest OSs 41, 42 registered in the guest OS setting file 33 (S31).

In addition, the CPU 1 (the virtual machine hardware management unit 23) cancels the assignment of parts of the hardware to the guest OSs 41, 42.

The CPU 1 determines whether operations of all the guest OSs 41, 42 are terminated or not (S32), and if it is determined that they are not terminated (S32: No), the CPU 1 returns to operation S31 and waits.

If the CPU 1 determines that operations of all the guest OSs 41, 42 are terminated (S32: Yes), the CPU 1 terminates the operation of the application of the main process which is being executed by a plurality of OSs (guest OSs) executing different applications (sub-processes).

In the above described embodiment, a configuration has been described as an example in which the main OS 31 has the function of the setting file generating unit 32 for generating the guest OS setting file 33 and the cooperation setting file 34 from the application operation file 51.

In contrast to this configuration, the hypervisor 21 may have the function of the setting file generating unit 32.

In the above described embodiment, the first guest OS 41 is caused to execute only the network connection application 50*a* and the second guest OS 42 is caused to execute only the user authentication application 50*b*.

However, the present invention is not limited to such a configuration. For example, a configuration in which a signal guest OS is caused to execute a plurality of applications may be achieved by a similar process.

The control unit of the information processing device disclosed in the present invention includes a unit which starts up each of executing unit in an order based on a relationship between sub-processes indicated by cooperation information, and a unit which sets a communication channel between the sub-processes executed by the respective executing units.

According to this configuration, the order of starting up applications which operate on different OSs can be managed automatically using a relationship between sub-processes indicated by one cooperation information, and therefore the burden of managing startup of applications on a user is expected to be reduced.

In addition, the information processing device disclosed in the present invention includes a monitoring unit which monitors an operating state of each of the executing units, wherein the control unit controls each operation of the executing units based on the operating state of each of the executing units monitored by the monitoring unit and the cooperation information acquired by the cooperation information acquiring unit.

According to this configuration, the monitoring unit recognizes a relationship between sub-processes and controls applications operating on different OSs such that operations of the applications look as if they are one application's operation.

As a result, the user does not need to prepare an additional application for this system, and cost for purchasing applications is expected to be reduced.

In addition, the cooperation information of the information processing device disclosed in the present invention includes priorities of processes executed by the respective executing units, and the control unit causes each of the executing units to execute according to the priorities included in the cooperation information.

According to this configuration, the order of starting up applications which operate on different OSs can be managed using a relationship between sub-processes indicated by one cooperation information, and further the applications can be automatically started up while whether cooperation between the applications is completed or not is confirmed. Therefore, the trouble of starting up applications is expected to be reduced.

In addition, the information processing device disclosed in the present invention includes a unit which, when operation of any of the executing units for executing the main process has been terminated, determines whether an executing unit which performs a process whose priority is higher than a priority of a process executed by the executing unit operation of which has been terminated is in operation or not based on the priorities included in the cooperation information, wherein if it is determined that the executing unit which performs the process whose priority is higher than the priority of the process executed by the executing unit operation of which has been terminated is in operation, the control unit starts up the operating unit operation of which has been terminated.

According to this configuration, abnormal states of OSs and applications which operate on different OSs can be detected and normal states thereof can be recovered with reference to a relationship between sup-processes indicated by cooperation information as a normal state. Therefore, the operational load on a user in the event of trouble is expected to be reduced.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An information processing method which is used in an information processing device including a plurality of executing units for executing various processes, the information processing method comprising:

generating setting information that indicates an operating condition with respect to each of the executing units from information of an operation of a main process executed by the plurality of executing units;

setting an operating state of each of the executing units based on the setting information generated and associating the executing units with a respective sub-process using information of the operation of the main process;

generating cooperation information that indicates a relationship between sub-processes executed by respective the executing units from the information of the operation of the main process; and controlling startup and execution of the respective sub-process by at least one of the executing units indicated in the associating and using the cooperation information generated from the information of the main process, and wherein the cooperation information includes priorities of processes executed by the respective executing units, and each of said executing units is controlled to execute according to the priorities included in the cooperation information, wherein the operation comprising:

determining, when an operation of any of the executing units for executing the main process has been terminated, whether an executing unit which performs a process whose priority is higher than a priority of a process executed by an executing unit an operation of which has been terminated is in operation based on the priorities included in the cooperation information, and wherein when determining that the executing unit which performs the process whose priority is higher than the priority of the process executed by the executing unit the operation of which has been terminated is in operation, the control unit starts up the executing unit operation of which has been terminated.

2. An information processing device which includes a plurality of executing units for executing various processes, the information processing device comprising:

a memory; and a processor to execute an operation:

generating setting information that indicates an operating condition with respect to each of the executing units from information of an operation of a main process executed by the plurality of executing units;

setting an operating state of each of the executing units based on the setting information generated and associating the executing units with a respective sub-process using information of the operation of the main process;

generating cooperation information that indicates a relationship between sub-processes executed by respective executing units from the information of the operation of the main process; and controlling startup and execution of the respective sub-process by at least one of the executing units indicated in the associating and using the cooperation information generated from the information of the main process, wherein the cooperation information includes priorities of processes executed by the respective executing units; and each of said executing units is controlled to execute according to the priorities included in the cooperation information, wherein the operation comprising:

determining, when an operation of any of the executing units for executing the main process has been terminated, whether an executing unit which performs a process whose priority is higher than a priority of a process executed by an executing unit an operation of which has been terminated is in operation based on the priorities included in the cooperation information, and wherein when determining that the executing unit which performs the process whose priority is higher than the priority of the process executed by the executing unit the operation of which has been terminated is in operation, the control unit starts up the executing unit operation of which has been terminated.

3. The information processing device according to claim 2, the operation comprising:

starting up each of the executing units in an order based on the relationship between the sub-processes indicated by the cooperation information; and setting a communication channel between the sub-processes executed by the respective executing units after a startup of each of the executing units.

4. The information processing device according to claim 2, the operation comprising:

monitoring an operating state of each of the executing units, and wherein an operation of each of the executing units is controlled based on the operating state of each of the executing units monitored and the cooperation information acquired.

5. The information processing device according to claim 2, wherein the setting information is information which indicates an assignment of hardware resource and software resource to each of the executing units.

6. A non-transitory computer readable recording medium which stores a computer program to cause a computer to operate a plurality of executing units that execute various processes, the computer program causing the computer to execute:

generating setting information that indicates an operating condition with respect to each of the executing units from information of an operation of a main process executed by the plurality of executing units;

setting an operating state of each of the executing units based on the setting information generated and associating the executing units with a respective sub-process using information of the operation of the main process;

generating cooperation information that indicates a relationship between sub-processes executed by respective the executing units from the information of the operation of the main process; and controlling startup and execution of the respective sub-process by at least one of the executing units indicated in the associating and using the cooperation information generated from the information of the main process, and wherein the cooperation information includes priorities of processes executed by the respective executing units, and each of said executing units is controlled to execute according to the priorities included in the cooperation information, wherein the computer program causing the computer to execute:

determining, when an operation of any of the executing units for executing the main process has been terminated, whether an executing unit which performs a process whose priority is higher than a priority of a process executed by an executing unit an operation of which has been terminated is in operation based on the priorities included in the cooperation information, and wherein when determining that the executing unit which performs the process whose priority is higher than the priority of the process executed by the executing unit the operation of which has been terminated is in operation, the control unit starts up the executing unit operation of which has been terminated.

\* \* \* \* \*